United States Patent Office 3,236,845
Patented Feb. 22, 1966

3,236,845
PRODUCTION OF CYANURIC ACID FROM UREA
Herbert A. Baskin, Covington, Tenn., assignor to W. R. Grace & Co., New York, N.Y., a corporation of Connecticut
No Drawing. Filed Apr. 26, 1963, Ser. No. 276,086
1 Claim. (Cl. 260—248)

This is a continuation-in-part of my copending application Serial Number 209,218, filed July 11, 1962, now abandoned.

This invention relates to cyanuric acid. More particularly, the invention relates to an improved process for the production of cyanuric acid by pyrolysis-condensation of urea.

In summary, this invention is directed to a process for preparing free flowing cyanuric acid that is substantially free of ammelide and other impurities that are substantially insoluble in water. The method comprises passing an intimate mixture of cyanuric acid and urea in the weight ratio of about 7–40:1 through a pyrolysis zone maintained at about 200–325° C. in an atmosphere of ammonia.

Preferred embodiments of this invention include the use of temperatures of about 280–315° C. and reaction mixtures composed of cyanuric acid and ureau mixed in the weight ratio of about 8–25:1.

Various methods have been disclosed in the past for the production of cyanuric acid. Thus, cyanuric acid has been made by means of hydrolyzing cyanuryl chloride, or by reacting a potassium cyanate solution with dilute acetic acid which leads to the formation of monopotassium cyanurate,

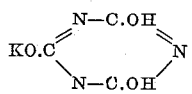

from which cyanuric acid is liberated by the action of mineral acids. Other methods include heating the crude reaction product of phosgene and ammonia to about 200° centigrade, or treating urea with chlorine at 130–140° centigrade, or with anhydrous zinc chloride at 170–220° centigrade. However, all these methods result in low yields and require relatively complex equipment.

Another common method of preparing cyanuric acid is merely to fuse urea above the temperature range in which it decomposes, e.g., 190–250° centigrade. Under these conditions ammonia is evolved and cyanuric acid is formed in accordance with the following general equation:

$$3(NH_2)_2CO \longrightarrow C_3H_3O_3N_3 + 3NH_3$$
(urea)           (cyanuric acid)

Fluxes or catalysts such as ammonium chloride or zinc chloride may be added to increase yields as described in the Journal of the Society of Chemical Industries, vol. 67, p. 66 (1948), and in U.S. Patent No. 2,527,316, issued October 24, 1950, to Johnstone S. Mackay. However, when cyanuric acid is formed from urea by pyrolysis of the molten urea to a solid product, with or without a catalyst or flux being present, the product hardens or sets up in the synthesis vessel causing severe operational difficulties. Solids form and build up on the heating surfaces impeding heat conductance and preventing agitation of the reaction mass, thereby decreasing the rate of reaction and frequently making it impossible to drive the reaction to completion even with increased reaction times. Additionally, the product cake clings tenaciously to surfaces within the reactor (even glass walled surfaces) causing intermittent operation and in reality limiting the process to a batch operation. Furthermore, said processes yield final products that often contain 25% or more ammelide, $C_3H_4O_2N_4$, a substantially insoluble impurity.

It is an object of this invention to provide a simple and inexpensive process for production of cyanuric acid from urea. It is another object of this invention to provide a process for the production of cyanuric acid from urea which does not result in concomitant production of undesirable impurities (particularly ammelide) in large amounts. Other objects will be apparent to those skilled in the art in view of the more detailed description which follows.

The presence of ammelide is very objectionable in cyanuric acid intended for most chemical uses including the syntheses of isocyanurate and cyanurate esters and chlorinated derivitives of cyanuric acid. Hence, it is necessary to convert the ammelide portion of the crude cyanuric acid produced by said processes to cyanuric acid by acid hydrolysis before using said cyanuric acid for such purposes:

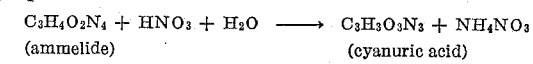
(ammelide)           (cyanuric acid)

This step is time consuming; furthermore, it requires the use of expensive equipment capable of withstanding the action of hot mineral acid.

During one phase of the work resulting in this invention, I made the surprising discovery that free flowing cyanuric acid, substantially free of ammelide and other impurities of lower solubility in water, can be obtained, in ultimate yields of about 85% of theory, by forming a mixture of about 10 parts by weight of cyanuric acid and 1 part by weight of urea and feeding said mixture into a heated (ca. 300° C.) pyrolysis zone (closed except for an entrance and an exit) consisting of an electrically heated insulated cylinder about 1 inch internal diameter, and conveying the reaction mixture through said zone by rotating therein a closely fitting rotatable helix at rates providing a residence time of about 1 minute. When operating under these conditions my apparatus did not become plugged, product exiting the reactor was free flowing at all times. Furthermore, said product did not contain detectable quantities of ammelide or other impurities that are substantially insoluble in water, and no gummy or sticky mass, of the type usually encountered when pyrolyzing urea, resulted. These truly surprising and highly gratifying results were contrary to expectation.

Through further investigation, I found that free flowing cyanuric acid, substantially free of ammelide and other impurities that are substantially insoluble in water, can be obtained when the temperature of the above described reactor is maintained within the range of about 200–325° centigrade while passing mixtures of about 7–40 parts by weight of cyanuric acid per part of urea through said reactor with a residence time of about 1–2 minutes. At temperatures below about 200° centigrade yields of cyanuric acid are very poor, and cyanuric acid is decomposed to yield water insoluble products at temperatures above about 325° centigrade. When the weight ratio of cyanuric acid to urea was lower than about 7:1, the reaction mixture became gummy when fed into the hot reactor. This sticky mass was very difficult to process through the reactor. I made the further surprising discovery that the reaction product was contaminated with ammelide when the weight ratio of cyanuric acid to urea was higher than about 40:1.

Previous to my discovery, it was believed, according to the teaching of Westfall (U.S. Patent 2,943,088), that presence of ammonia was detrimental to the synthesis of cyanuric acid by the pyrolysis of urea. (Westfall teaches that the presence of ammonia favors the formation of cyanuric amides.) My further work, described in detail in Examples I and II, below, makes it clearly evident that the presence of ammonia during said synthesis inhibits the formation of ammelide and other substantially water insoluble impurities. Thus, my surprising discovery makes it possible to prepare substantially pure free flowing cyanuric acid from urea by a simple process involving the following steps:

(1) Prepare a reaction mixture of urea and cyanuric acid (about 7-40 parts by weight of cyanuric acid to 1 part by weight of urea).

(2) Pass the reaction mixture through a heated (ca. 200-325° C.) pyrolysis zone, at substantially atmospheric pressure, while maintaining an appreciable quantity of free ammonia in said zone. (This can be done by maintaining said zone closed to the atmosphere, except for the entrance and exit ports, thereby retaining the ammonia generated in situ within the system.) Alternatively, especially if the reaction zone is not completely filled with said reaction mixture or if ammonia tends to escape from the system faster than it is generated therein, the system can be flushed with gaseous ammonia at about atmospheric pressure. The amount of ammonia necessary is at least the amount which is inherently or autogenously evolved from the urea used under the conditions of this invention. Greater amounts than this minimum can be used, but offer no proportionate advantage.

(3) The free flowing product exit the reaction zone is washed with water to remove unreacted urea and any biuret which forms during the pyrolysis. (The water soluble urea and biuret can be recovered from the solution, mixed with cyanuric acid, and passed through the pyrolysis zone, or the solution can be used as nitrogen fertilizer.)

(4) The washed cyanuric acid is separated from the wash water, dried, and bagged or sent to a plant where it can be used as an intermediate in chemical syntheses.

The only essential reactant for the process of my invention is particulate urea. The process does not require the use of fluxes or catalysts such as ammonium chloride, zinc chloride and the like. These auxiliary materials may, however, be used if desired, but little or no advantage is gained in the present process.

The specific particle size of the urea reactant is not critical. Commercially available urea in the form of crystals or prills ranging in size from about −15 to about −200 mesh (U.S. Standard) is quite suitable. In the experimental runs which were performed to demonstrate the utility of the process −30 mesh (U.S. Standard) urea particles were used for convenience.

The weight ratio of cyanuric acid to urea in the feed stream of the instant process must be at least about 7 to 1. Ratios up to about 40:1 are satisfactory, while ratios of about 8-25:1 are generally preferred. When the ratio is below about 7:1 (e.g., 5 or 6:1) the product has undesirable physical properties and is difficult to process for it tends to become gummy and plug the reactor. High ratios (e.g., ca. 50:1) tend to induce ammelide formation because of the relatively low ammonia partial pressures which result from the pyrolysis of such mixtures. The temperature of the reacting mass is maintained between about 200-325° C. and preferably at about 280-315° C. Temperatures below about 200° C. are insufficient to produce commercially significant yields of cyanuric acid. Temperatures above about 325° C. tend to cause formation of undesirable ammelide by-product.

The use of one or more helicoid screws is a satisfactory method for conveying the reaction mixture through the pyrolysis zone. The screws can be hollow helices and shafts through which a fluid heat exchange agent passes. Alternatively, and I prefer this alternate when using a reactor with a capacity of above about 50 pounds, the helicoid screws can be replaced with shafts equipped with pug mill paddles which mix the reaction mass while transporting it through the pyrolysis zone.

Numerous other conveying devices suitable for this purpose will be obvious to those skilled in the art. Heating means can be of any desired type, e.g., steam coils, electrical resistance heaters, or heat exchange fluid passages bored or inserted in or wrapped around the enclosed reaction chamber.

It is impossible to specify an exact reaction time (i.e., residence time in the heated reaction chamber, or pyrolysis zone), because residence time is an inverse function of both the rate of heat transfer in the system and the temperature at which the reaction is conducted. The rate of heat transfer depends upon the reactor size; said rate is more rapid in a small reactor with a capacity of a fraction of a pound than in a large reactor with a capacity of several hundred pounds. The following table summarizing my results will serve as a guide for a chemist, engineer, or other person skilled in the art, providing he uses the table as a guide and not as a recipe prescribing absolute and invariable residence times:

| Approximate Reactor Capacity, lbs. | Approximate Reactor Temp., ° C. | Approximate Residence Time, Minutes |
| --- | --- | --- |
| ¼ | 200 | 2 |
| ¼ | 325 | 1 |
| 125 | 200 | 50 |
| 125 | 325 | 20 |
| 500 | 200 | 90 |
| 500 | 325 | 50 |

Cyanuric acid produced by the process of this invention can be recycled indefinitely without adversely affecting the product providing:

(1) The weight ratio of cyanuric acid to urea in the material passed through the pyrolysis zone is maintained at about 7-40:1.

(2) The temperature of the zone is maintained within the range of about 200-325° C.

(3) The pyrolysis is conducted at substantially atmospheric pressure while maintaining a substantial quantity of free ammonia in the pyrolysis zone.

The invention will be further understood after referring to the following specific, but non-limiting examples. In the examples all parts are parts by weight unless otherwise specified.

Examples I and II were run to study the effect of the presence of ammonia on the nature of the products obtained when urea is pyrolyzed. Example I reports the results of a pyrolysis conducted in the presence of ammonia, while Example II reports the results of a similar pyrolysis conducted in the substantial absence of ammonia. The results of these runs are truly surprising, because they show that, directly contrary to the teaching of Westfall (U.S. Patent 2,943,088), the presence of ammonia discourages the formation of ammelide (a cyanuric amide).

*Example I*

A 50 g. portion of particulate urea (−30 mesh U.S. Standard) was spread over the bottom of a 4 liter Erlenmeyer flask which was then flushed with gaseous ammonia. A stream of ammonia gas (ca. ¼ ft.³/hr.) was passed through the system while heating for about 2 hours at about 285° C. Product weighing 31.8 g. and analyzing 62% cyanuric acid was obtained. This product was substantially free of ammelide and other substantially water insoluble impurities.

*Example II*

The apparatus and method of Example I were used in this run; however, the system was flushed with nitrogen gas after spreading the urea over the bottom of the flask, and the system was flushed with nitrogen gas (ca. ¼ ft.³/hr.) while heating for about 2 hours at about 285° C. Product weighing 32.6 g. and analyzing 74% cyanuric acid and 3% ammelide was obtained.

Example III (Screw conveyor reactor)

The apparatus used in this example comprised a 20-inch length of nominally 1 1/16-inch inside diameter steel pipe having reversibly inserted therein a one-inch outside diameter rotatable spiral screw, also about 20 inches long. The spiral screw had a pitch of about 1.2 inches, i.e., slightly greater than the ordinary screw conveyors which have pitches approximately equal to the diameter. The screw was inserted in one end of the tube and mounted on a bearing. An extended shaft on the spiral screw at the bearing end of the tube was detachably connected to the drive shaft of an electric motor; and rotation of the screw was controlled by means of a variable speed transmission on the motor. A hole was bored through the top of the tube about two inches from the bearing end and a funnel was welded about the hole and perpendicular to the tube wall to serve as a feed chamber. Two thermocouples were attached to the outer surface of the 20 inch tube about 8 to 12 inches, respectively, from the bearing end. These devices were used to measure the skin temperature of the heated section (pyrolysis zone) of the reactor. A 26 foot length of Chromel electric resistance wire, insulated with ceramic beads, was spirally wrapped about the length of the tube and bedded down and held in place with a refractory cement. Asbestos pulp about ½ inch thick was coated over the cement to insulate the tube and to protect the cement. The temperature of the tube was controlled by a variable transformer connected to the lines leading to the electric resistance wire.

One kilogram of substantially pure cyanuric acid (23 parts by weight) was mixed with about 43 g. (i.e., ca. 1 part by weight) of particulate (−30 mesh) urea. The mixture was fed through the above described screw conveyor while maintaining the temperature of the reaction zone between about 240–255° C. and rotating the screw at about 46 revolutions per minute.

From the product of the first pass a 1000 g. portion was retained and blended with an additional increment (ca. 43 g.) of urea. The resulting mixture was passed through the reactor under the same conditions. The procedure was repeated for a total of 12 passes through the reactor (a total of 520 grams of urea was fed). Total product from the 12 passes weighed 1462 grams, representing 96.3% of materials charged. Analysis of the final product showed that it contained 75.3% by weight of cyanuric acid. The balance was urea and very minor amounts (less than 0.2%) of various by-products. No ammelide could be detected in the product.

The conversion of urea to cyanuric acid in this example was 27% of theoretical, and the ultimate yield was 88% of theoretical.

The yields are calculated as follows, knowing that three moles of urea yield one mole of cyanuric acid and hence that 1 gram of urea should theoretically yield 0.7164 gram of cyanuric acid product:

$$1462 \times 0.753 = \frac{1100.9 \text{ grams cyanuric acid found}}{\frac{-1000.0 \text{ grams cyanuric acid added}}{100.9 \text{ grams cyanuric acid produced}}}$$

$520 \times 0.7164 = 372.5$ grams of cyanuric acid for 100% conversion $$100 \times \frac{100.9}{372.5} = 27.1\% \text{ of theoretical conversion}$$

$1462 \times 0.246 = 359.7$ grams of urea found 520 grams of urea was added. Thus, 160.3 g. of urea was consumed.

$160.3 \times 0.7164 = 114.8$ grams of cyanuric acid for 100% yield.

$$\text{Ultimate yield} = 100 \times \frac{100.9}{114.8} = 87.9\% \text{ of theoretical}$$

Example IV (Screw conveyor reactor)

A series of runs was made to investigate the effect of temperature on preparation of cyanuric acid from urea in accordance with this invention. In all runs the spiral screw of the above-described apparatus was rotated at 30 revolutions per minute. The temperature for the respective runs is shown in the following table, together with other pertinent data.

TABLE I

| Run No. | Number of Passes | Temperature (deg. centigrade) | Feedstock | Grams Fed | Grams Product | Product Analysis [1] | |
|---|---|---|---|---|---|---|---|
| | | | | | | Cyanuric Acid | Urea |
| 2a | 1 | 260 | Cyanuric acid plus 15 weight percent urea. | 360 and 40 | [2] 375 | 87 | 13 |
| 2b | 1 | 275 | Product from Run 2a | 365 | [2] 355 | 92 | 8 |
| 2c | 1 | 290 | Procudt from Run 2b | 345 | 337 | 100 | 0 |
| | | | Reactor residue | | 36 | 89 | 6 |

[1] Weight percentages of respective compounds.
[2] 10 gram portions used for chemical analysis.

No biuret and no ammelide could be detected in the chemical analyses of each of the products from Runs 2a thru 2c.

A comparison of Runs 2a, 2b, and 2c show that the conversion of urea to cyanuric acid increases with temperature over the range of about 260–290° C. when reaction time is held constant. It is significant that the increased conversion is obtained without any increase in the biuret or ammelide content of the product.

Example V (Screw conveyor reactor)

*Continuous preparation of cyanuric acid from urea.*— In this example the reacting materials were maintained at about 290° C. and the spiral screw was rotated at 30 revolutions per minute. The reaction apparatus was the same as that used in Example III except that an aluminum shield was placed above the reactor's exit to condense and collect vapors leaving the reactor.

To commence the run, a particulate mixture of 360 g. of substantially pure cyanuric acid and 40 g. of urea was prepared. This mixture was passed through the reactor once under the above conditions. A 360 g. portion from the initial product was blended with an additional 40 g. of urea (recycle ratio of 9 to 1 on a weight basis) and this blend was also passed through the reactor once. The procedure was repeated until the total of 800 g. of urea had been charged (20 total passes). The reactor was then dismantled and residue therein was collected and analyzed. Analysis of the product, reactor residue and collected condensate gave the following results:

| Material | Total Weight (grams) | Analysis, Weight Percent of— | | |
|---|---|---|---|---|
| | | Cyanuric Acid | Urea | Ammelide |
| Product | 775 | 88.4 | 5.9 | Nil |
| Reactor Residue | 43 | 82 | 10 | 3 |
| Condensate | 81 | 6 | 79 | Nil |

The conversion in this run was 64% of theoretical and the ultimate yield was 76% of theoretical.

Ammelide present in the reactor residue is a result of the very low ammonia concentration on the inner surface of the thin layer of material adhering to the internal wall of the reactor.

Any unreacted urea and small amounts of by-product biuret, etc. in the cyanuric acid produced by the process described herein can be removed by washing the product with water. In all cases cyanuric acid of at least about 99% purity can be produced by this process. Urea in the wash water can be readily recovered by evaporation and crystallization. The recovered urea can be recycled to the process in order to increase the overall yield. Alternatively, the urea solution can be used as fertilizer.

*Example VI*
(Reactor with pug mill paddles)

*Continuous preparation of cyanuric acid from urea.*—The apparatus for this run consisted of an indirect heated (hot oil), closed, two-screw heat exchanger ("Holo-Flite" Processor), with an entrance and an exit, but modified by replacing the screws with rotating shafts equipped with pug mill paddles. The capacity of the unit's heated reaction chamber was about 125 pounds of cyanuric and the device was adjusted to provide a residence time of about 30 minutes. Temperature was maintained at about 280° C.

A particulate mixture of 500 pounds of cyanuric acid and 25 pounds of urea (20:1 weight ratio) was prepared and passed through the reactor. A 500 pound portion of product from the reactor was collected, mixed with 25 pounds of urea and recycled; all product in excess of that required for recycle was placed in a drum and saved for analysis. This procedure was repeated until a total of 250 pounds of urea had been fed into the reactor (i.e., a total of 10 passes). All of the product (that from the tenth pass plus the portions set aside for analysis after each of the preceding 9 passes) was placed in a drum, weighed, mixed thoroughly, and analyzed. Said product weighed 725 pounds and analyzed 81% cyanuric acid and 15% urea. No ammelide could be detected in this material. These results correspond to a conversion of 48% of theory and an ultimate yield of 93% of theory.

I claim:

In the fully continuous process of preparing free flowing cyanuric acid from urea which comprises: (a) forming a mixture of urea and cyanuric acid; (b) continuously feeding said mixture into a pyrolysis zone maintained at about 200–325° C., closed except for entrance and exit ports, and maintained at substantially atmospheric pressure; (c) continuously conveying said mixture through said zone while continuously rotating the moving mixture; (d) continuously recovering cyanuric acid product at the discharge end of said zone; (e) and continuously recycling the required amount of said product to said mixture-forming step, the improvement comprising forming said mixture of urea and cyanuric acid in the weight ratio of about 7–40 parts of cyanuric acid to 1 part of urea, and maintaining an atmosphere of ammonia within said zone, thereby to produce cyanuric acid, substantially free of ammelide and other impurities that are substantially insoluble in water.

References Cited by the Examiner

UNITED STATES PATENTS

| 2,918,467 | 12/1959 | Hibbitts et al. | 260—248 X |
| 2,943,088 | 6/1960 | Westfall | 260—248 |
| 3,154,545 | 10/1964 | Symes et al. | 260—248 |

FOREIGN PATENTS 1,253,865  1/1961  France.

OTHER REFERENCES

Smolin et al., "s-Triazines and Derivatives," Interscience Publishers Inc., New York (1959), p. 309.

WALTER A. MODANCE, *Primary Examiner.*

NICHOLAS S. RIZZO, JOHN D. RANDOLPH,
*Examiners.*

MARION W. WESTERN, J. M. FORD,
*Assistant Examiners.*